Figure 1:
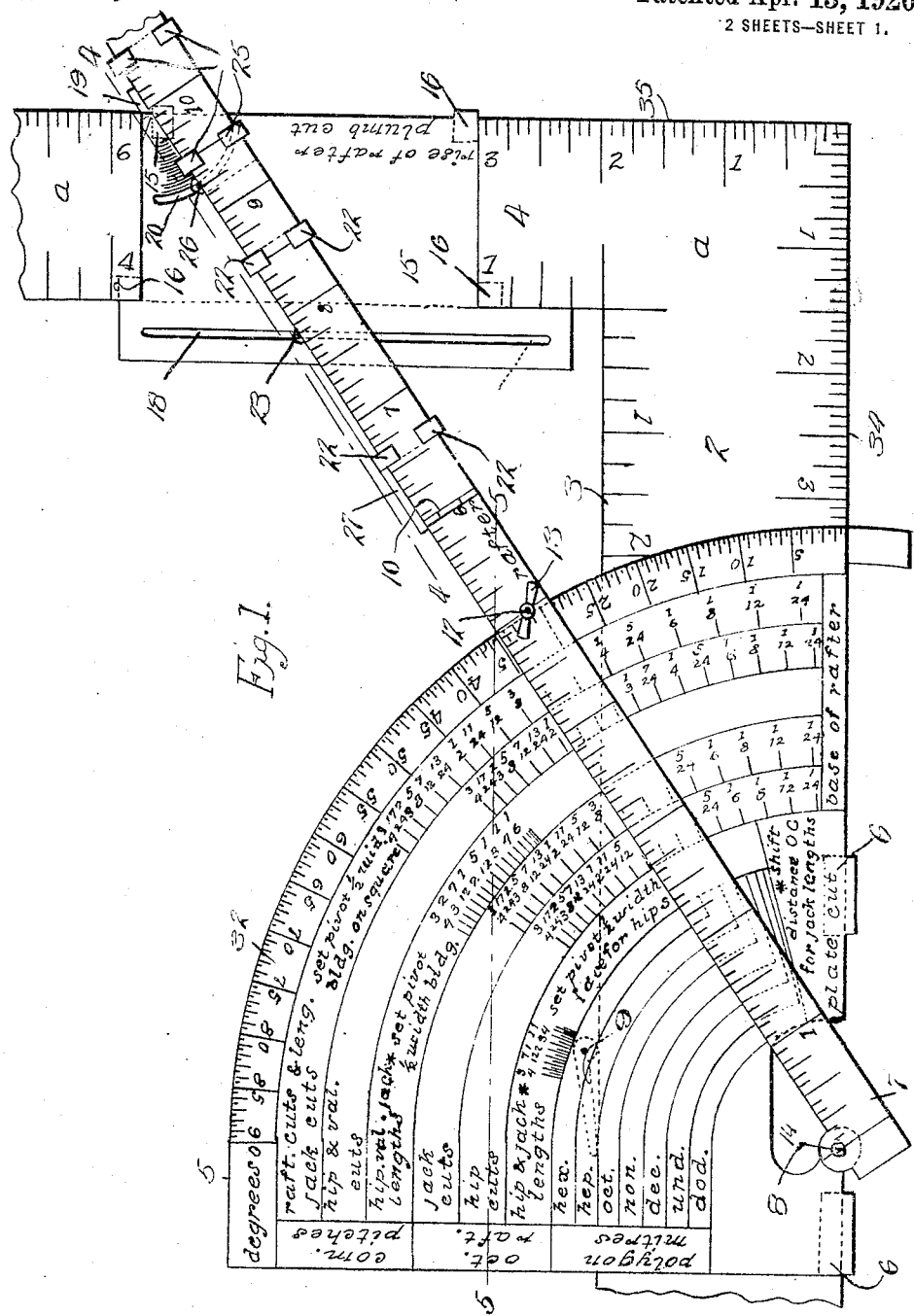

L. A. VAN NEST.
ROOF FRAMING TOOL.
APPLICATION FILED AUG. 14, 1916.

1,337,107.

Patented Apr. 13, 1920.
2 SHEETS—SHEET 1.

Witnesses

Inventor
Levi Augustus Van Nest

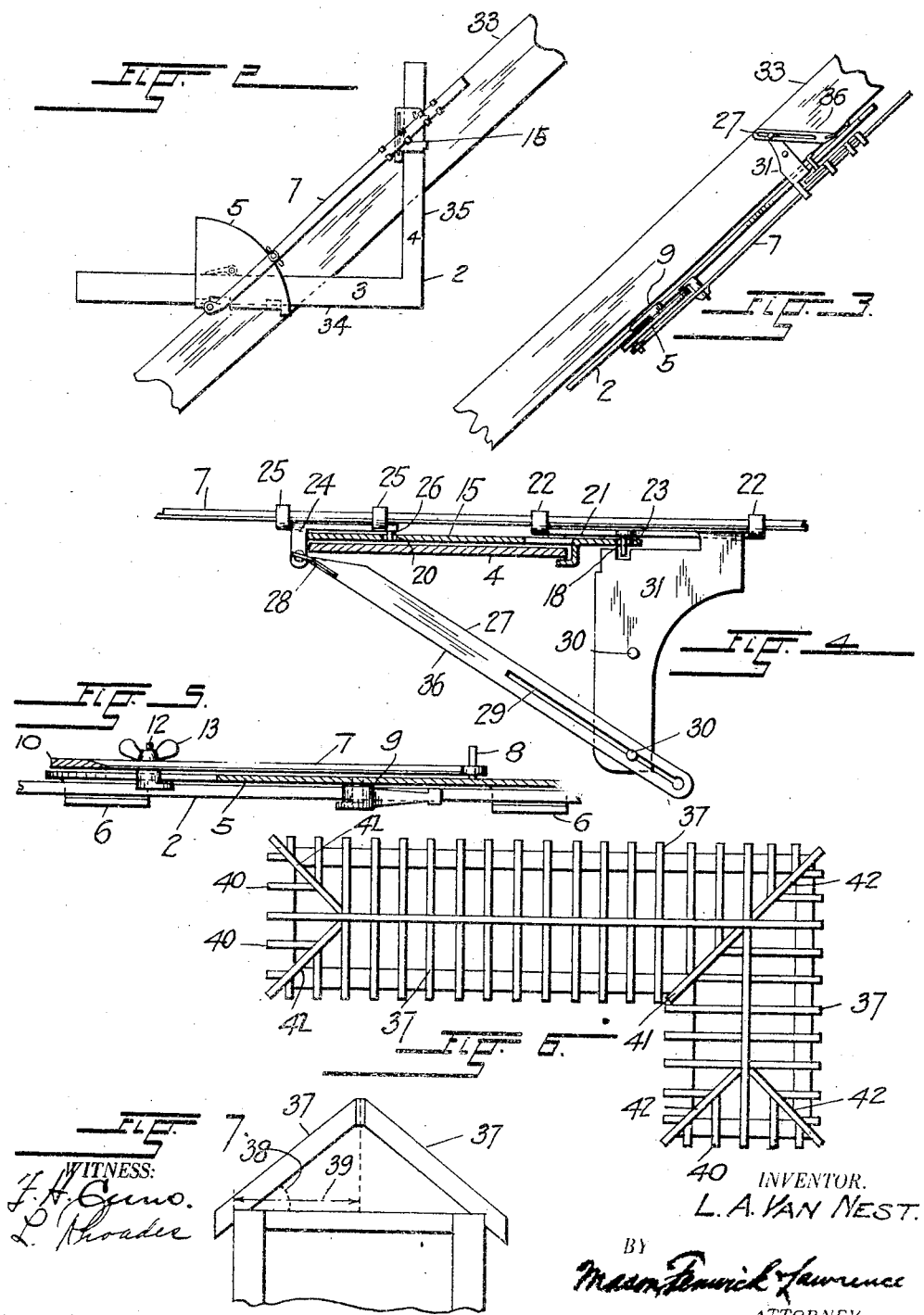

ously, a longitudinal slot 20 through which extends a screw 21 adapted to secure it in its adjusted position upon the tongue of the square.

UNITED STATES PATENT OFFICE.

LIN A. VAN NEST, OF LA JUNTA, COLORADO.

ROOF-FRAMING TOOL.

1,337,107.   Specification of Letters Patent.   Patented Apr. 13, 1920.

Application filed August 14, 1916. Serial No. 114,864.

*To all whom it may concern:*

Be it known that I, LIN A. VAN NEST, a citizen of the United States, residing at La Junta, in the county of Otero and State of Colorado, have invented a new Roof-Framing Tool in the Form of an Automatic Attachment for the Steel Square, Useful to All Woodworking Mechanics, of which the following is a specification.

This invention relates to roof framing tools and its primary object resides in the provision of a measuring device of simple construction which in combination with a graduated square produces a convenient and accurate instrument to ascertain the lengths of the different rafters in a roof structure and to determine the angles along which they must be cut to properly fit adjoining parts.

With the above objects in view, my invention comprises a protractor, a pivoted radial rule which coöperates therewith, and a device which in association with the rule, indicates the angles at which the rafters must be sawed to obtain what is commonly known as their miter cut.

The protractor and the angle measuring device are adapted to be slidingly mounted upon the bar and the tongue of an L-shaped square of ordinary construction, which while by itself no part of my invention is an essential element in the operation thereof.

By the use of an instrument comprising the assembled parts hereinabove referred to, the operator may readily ascertain the lengths of common rafters, jack rafters and hip- and valley-rafters of roofs of different forms and construction and lay off without intricate calculations or the use of other tools, all the angles required to fit the roof parts together, by what are commonly known as plumb cuts, plate cuts and miter cuts.

With the above objects in view, my invention comprises the arrangement of parts and combinations of devices an illustrative embodiment of which is shown in the accompanying drawings in the various views of which like parts are similarly designated and in which—

Figure 1 is a face view of my improved measuring mechanism in its operative position on an L-shaped square, Fig. 2, shows the application of the instrument to a rafter for measuring the angles of the plate and plumb cuts thereon, Fig. 3, a view of the instrument at right angles to that shown in the preceding figures, illustrating the method of laying off the angles for the miter cuts, Fig. 4, an enlarged section taken along the line 4—4, Fig. 1, Fig. 5, a section taken along the line 5—5, Fig. 1, and Figs. 6 and 7, a diagrammatic representation showing in plan and cross section the framing of an ordinary hip-roof.

Referring more specifically to the drawings, the reference character 2 designates an L-shaped square composed as usual of a bar 3 and a tongue 4 both graduated to show inches and fractions of inches.

A quadrant protractor 5 is slidably mounted upon the bar of the rule by means of angular clips 6 which are formed integrally at one of its edges.

The protractor carries a radial arm 7 which is pivoted as at 8 in the center of its arc and it is also provided with a pivoted cam 9 adapted to secure it in its adjusted positions on the square by frictional engagement with the edge of the bar thereof opposite to that embraced by the clips.

The radial arm consists of a straight and beveled edge rule which along its beveled edge is graduated to show inches and fractions of inches and which for convenience in carrying or handling may be jointed as at 10.

A clamp consisting of a screw 12 which extends through an aperture of the rule 7, a lip formed at the lower end thereof to embrace the nearest edge of the protractor, and a wing-nut 13 applied to its opposite threaded end, is provided to secure the rule in its adjusted position with relation to the protractor, and the latter has a sight-opening 14 through which the position of its center with relation to the graduations on the bar of the square may be observed.

The rule is supported upon a plate 15 which is slidably mounted upon the tongue of the square by means of angular clips 16 embracing the edges thereof.

The plate projects laterally beyond the inner edge of the tongue and which has a longitudinal slot 18 for the guidance of a carrier hereinafter to be described.

The plate 15 has at its forward corner at the outer edge of the square, a pointer 19 which coöperates with the scale on the tongue of the square and with the graduated edge of the rule 7, and it has, furthermore, an arcuate slot 20 the position of the center of which coincides with that of the pointer 19.

In the operation of the instrument it is desirable that the graduated edge of the rule should remain as near as possible in register with the pointer 19 of the plate during the sliding movement of the latter along the tongue of the square and with this end in view, I have mounted the square upon a carrier-member 21 which has a plurality of lips 22 loosely embracing the longitudinal edges of the rule and a pin 23 which has a combined rotary and sliding movement in the slot 18 which is parallel to the longitudinal edges of the plate.

The rule is furthermore supported upon a follower 24 which while separate from the carrier 21 constitutes a part thereof in operation.

The follower is like the member 21 provided with clips 25 to loosely embrace the edges of the rule and it has a pin 26 extending into the arcuate slot 20.

A straight edged arm 27 below the plate 15 is at its upper end pivotally connected with the follower at a point immediately beneath the pointer 19 of the plate, by means of a small leaf-spring 28 and moves and lies in a plane perpendicular to the slide and rule.

The arm extends in practice, obliquely beneath the tongue of the square to which the plate is applied and it has a longitudinal slot 29 to receive one of two pins 30 which extend at different elevations from the face of a bracket 31 which forms an integral part of the carrier-member 21.

The arm 27 automatically acts in the operation of the instrument that is, upon relative movement of the carrier 21 and the follower 24, to determine the miter or side cuts of the rafters and it is adjusted from one of the pins on the bracket onto the other in accordance with the nature of the roof-structure of which the rafter forms a part.

The protractor has along its arcuate edge, a scale 32 graduated as usual to show angular degrees and fractions thereof, and in concentric relation to said scale it has a plurality of other scales which are graduated to determine the position of the rule to which it must be moved to determine the lengths of different rafters, and through the instrumentality of the straight edged bar 27, the miter or side cuts of the same.

The different scales and the graduations thereof have been appropriately marked as clearly shown in Fig. 1 of the drawings and by their coöperation with the graduated beveled straight edge of the rule, give the information required to readily ascertain the length and miter cut of any rafter of any roof structure.

The words and phrases shown in abbreviated form in Fig. 1 of the drawings are "leng" for "length," "wid" for "width," "bldg" for "building," "raft" for "rafter," "com" for "common," "val" for "valley cut," "hip" for "hip cut," "miter" for "miter cut," "jack" for "jack cut," "oct" for "octagon," "hex" for "hexagon," "hep" for "heptagon," "non" for "nonagon," "dec" for "decagon," "und" for "undecagon" and "dod" for "dodecagon."

The fractions indicate pitches of rafters of roofs of the different constructions designated on the scales.

Having thus described the mechanical construction of my improved roof framing instrument, it will be readily seen that as the plate 15 is moved along the tongue of the square, the rule 7 turns about its pivot on the protractor with its graduated edge in constant alinement with the pointer 19.

During the pivotal movement of the rule the straight-edged arm 27 is likewise moved about its pivot and is thereby automatically adjusted to the proper angle of the miter cut for the particular rafter for which the rule is adjusted with relation to the graduations on the scales of the protractor.

Referring to Fig. 2 of the drawings, the instrument is placed upon a side of the rafter 33 with the rule 7 extending parallel along the edge thereof. With the instrument in this position, the outer edge of the bar of the square designated in Fig. 1 of the drawings by the numeral 34, gives the direction of the plate cut and the outer edge of the tongue of the square designated by the numeral 35, the direction of the plumb cut of the rafter.

By placing the square of the instrument against a longitudinal edge of the rafter at right angles to that previously marked, with the rule extending along the edge thereof and the arm 27 resting upon the top edge to be marked as shown in Fig. 3, the position of the straight edge of the arm designated by the numeral 36 will give the direction of the miter or side, cut of the rafter.

To ascertain the cuts and length of any common rafter, it is necessary to know the pitch of the roof and the dimension between the foot of the rafter and the perpendicular of its upper end.

Referring to Figs. 6 and 7 of the drawings which illustrate in diagrammatical form the frame of an ordinary hip roof, the numeral 37 designates the common rafters, 38 the angle of the pitch, and 39 the basal dimension between the foot of the rafter and the perpendicular of its top, which in this instance is equal to one-half the width of the roof.

With the above two known quantities, the length of the rafters and the angles of their different cuts are ascertained as follows:

The rule 7 is moved about its pivot until its graduated edge registers with the graduation on the degree scale of the protractor which corresponds with the pitch of the roof.

After the rule is clamped in this position by the wing-nut 13, the protractor is moved along the bar of the square until its center registers with the graduation on the scale thereof which corresponds in inches and fractions of inches with the basal dimension 39 in feet and fractions of feet.

The protractor is clamped in its adjusted position by the clamp 9 and the instrument is placed upon the rafter in the manner shown in Figs. 2 and 3 and hereinbefore described, to determine the plate cut, the plumb cut and the miter or side cut of the rafter.

The distance in inches and fractions of inches between the pivotal center of the rule 7 and its graduations indicated by the pointer 19 on the plate 15, gives the length of the rafters in feet and fractions thereof and it will be seen that by measuring along the graduated edge of the tongue from its point of intersection with the scale of the bar to the point registering with the pointer 19, the length of the perpendicular from the top of the rafter to its base, or in other words, the rise of the rafter is readily ascertained.

With this knowledge at hand, the basal dimensions of the jack-rafters 40, the valley rafters 41 and the hip-rafters 42 are easily calculated and by adjusting the rule accordingly, their lengths and cuts are determined in the same manner as that herein described with relation to the common rafters.

Rafters of roofs of different constructions, are measured and cut at the proper angles by the same method, the different scales on the protractor indicating the points at which the rule must be set to give the desired dimensions and angles.

The arm 27 when resting upon the lower pin 30 of the bracket is arranged at an angle to the tongue of the square to give by the adjustment of the protractor and rule as hereinbefore explained, the miter or side cuts for all rafters excepting the hip- and jack-rafters of octagon roofs which require its adjustment to a position in which it rests upon the upper pin which is located at a point about five-twelfths of the distance along a perpendicular between the pin 23 and the lower pin.

Having thus described my invention in the best form at present known to me I desire it understood that variations in the form and construction of its parts may be resorted to within the spirit of my invention as set forth in the following claims:

1. An instrument of the character described comprising in combination with a graduated L-shaped square, a protractor slidably mounted upon a leg thereof and having a center coöperating with graduations on said leg, a slide mounted upon the other leg of the square and having a pointer coöperating with graduations on said other leg, and a graduated rule pivoted for movement about said center of and over the protractor, and movably mounted on said slide with its graduated edge in constant coöperative relation to the pointer of the same, the scaled surface of the protractor being disposed between the pivot of the rule thereof, and the other leg of the square so that the edge of the rule extending across the angle between the legs of the square swings over the protractor with the edge of the rule radial to the protractor center.

2. An instrument of the character described comprising in combination with a graduated L-shaped square, a protractor slidably mounted upon a leg thereof and having a center coöperating with graduations on said leg, a slide mounted upon the other leg of the square, a carrier mounted to move on the slide, a rule pivoted for movement about the center of the protractor and slidingly connected with said carrier, and an arm pivoted on the slide to move in a plane at right angles to the movement of the slide and connected to the carrier, whereby the arm is automatically angularly adjusted about its pivot on the slide upon relative movement of the carrier as to the slide and of the slide as to the protractor.

3. An instrument of the character described comprising in combination with a graduated L-shaped square, a protractor slidably mounted upon a leg thereof and having a center coöperating with graduations on said leg, a slide mounted upon the other leg of the square, a rule pivoted for movement about the center of the protractor and mounted to move longitudinally and angularly upon the slide, an arm pivoted at one end on the slide to swing in a plane at right angles to the plane of movement of the slide and rule, and means slidably connected to said rule and the slide for automatically swinging the arm upon relative movement of the slide and the protractor.

4. An instrument of the character described comprisng in combination with a graduated L-shaped square, a protractor slidably mounted upon a leg thereof and having a center coöperating with graduations on said leg, a slide mounted upon the other leg of the square and having a pointer, a carrier movably mounted on the slide, a follower having an arcuate movement on the same, and a graduated rule longitudinally slidably mounted on said carrier and said follower, with its graduated edge in constant coöperative relation to the pointer of the slide.

5. An instrument of the character described comprising in combination with a graduated L-shaped square, a protractor slidably mounted upon a leg thereof and having a center coöperating with graduations on said leg, a slide mounted upon the other leg of the square, a carrier movably mounted on the slide, a follower having an arcuate movement on the same, a rule pivoted for movement about the center of the protractor and longitudinally slidably mounted on the carrier and the follower, and an arm pivoted on said follower and supported on said carrier for movement about its pivot in a plane at right angles to the movement of the slide.

6. An instrument of the character described comprising in combination with a graduated L-shaped square, a protractor slidably mounted upon a leg thereof and having a center coöperating with graduations on said leg, a slide mounted upon the other leg of the square, a carrier movably mounted on the slide, a follower having an arcuate movement on the same, a rule pivoted for movement about the center of the protractor and longitudinally slidably mounted on the carrier and the follower, and an arm pivoted on said follower and adjustably supported on said carrier for movement about its pivot in a plane at right angles to the movement of the slide.

7. An instrument of the character described comprising in combination with a graduated L-shaped square, a protractor slidably mounted upon a leg thereof and having a center coöperating with graduations on said leg, a slide mounted upon the other leg of the square, a carrier movably mounted on the slide and having a depending bracket, a follower having an arcuate movement on the slide, a rule pivoted for movement about the center of the protractor, and longitudinally slidably mounted on the carrier and the follower, and an arm pivoted on the follower and supported on said bracket for movement about its pivot in a plane at right angles to the movement of the slide.

8. An instrument of the character described comprising in combination with a graduated L-shaped square, a protractor slidably mounted upon a leg thereof and having a center coöperating with graduations on said leg, a slide mounted on the other leg of the square and having a pointer, a carrier mounted to slide and swing on said slide, a graduated rule pivoted for movement about the center of the protractor and slidably connected with said carrier with its graduated edge in coöperative relation to said pointer, a swinging follower on the slide and an arm pivoted on the follower to move in a plane at right angles to the movement of the slide and connected to and operable by the carrier for automatic angular adjustment in a determined proportion to the movement of the carrier upon movement of the rule about its pivot, said protractor bearing scales coöperating with an edge of said rule, for measuring the longitudinal dimensions of different rafters, and through the instrumentality of said arm, the angles of cuts of the same.

9. An instrument of the character described comprising in combination with a graduated L-shaped square, a protractor slidably mounted upon a leg thereof and having a center coöperating with graduations on said leg, a slide mounted on the other leg of the square and having a pointer, a carrier mounted to slide and swing on said slide, a graduated rule pivoted for movement about the center of the protractor and slidably connected with said carrier with its graduated edge in coöperative relation to said pointer, a swinging follower on the slide and an arm pivoted on the follower to move in a plane at right angles to the movement of the slide and connected to and operable by its carrier for automatic angular adjustment in a determinate proportion to the movement of the carrier upon movement of the rule about its pivot, said protractor bearing scales coöperating with an edge of said rule, for measuring the longitudinal dimensions of rafters for different roof constructions.

10. An instrument of the character described comprising in combination with a graduated L-shaped square, a protractor slidably mounted upon a leg thereof and having a center coöperating with graduations on said leg, a slide mounted on the other leg of the square, a carrier mounted to move on said slide, a rule pivoted for movement about the center of the protractor and slidably connected with said carrier, and an arm connected to the slide to move in a plane at right angles to the movement of the slide and connected to and operable by the carrier for automatic angular adjustment in a determinate proportion to the movement of the carrier upon movement of the rule about its pivot, said protractor bearing scales coöperating with an edge of said rule, for measuring through the instrumentality of said arm, the angles of cuts for rafters of different kinds.

11. An instrument of the character described comprising in combination with a graduated L-shaped square, a protractor slidably mounted upon a leg thereof and having a center coöperating with graduations on said leg, a slide mounted on the other leg of the square, a carrier mounted to move on said slide, a rule pivoted for movement about the center of the protractor and slidably connected with said carrier, and an arm connected to the slide to move in a plane at right angles to the movement of the slide and connected to and operable by the carrier for automatic angular adjustment in a determinate proportion to the movement of the carrier upon movement of the rule about its pivot, said protractor bearing scales coöperating with an edge of said rule, for measuring through the instrumentality of said arm, the angles of cuts for rafters for different roof constructions.

12. The combination, with a carpenter's square, of a slide on one arm thereof and to which a rule is pivoted; a slide on the other arm thereof and carrying a follower pivoted to swing on the slide as the rule is adjusted; a carrier slidably mounted on the rule and operatively engaging the slide on which the follower is mounted; and a side-cut indicating bar pivoted on the follower and having its distal end movably connected to the carrier.

LIN A. VAN NEST.

Witnesses:
THEO. J. COOK,
NORMAN O. CULP.